United States Patent [19]

Ishikawa et al.

[11] Patent Number: 5,109,733

[45] Date of Patent: May 5, 1992

[54] HYDRAULIC CONTROL DEVICE FOR AN AUTOMATIC TRANSMISSION

[75] Inventors: Kazunori Ishikawa; Kazumasa Tsukamoto, both of Toyota; Takuji Taniguchi, Okazaki; Yutaka Taga, Aichi, all of Japan

[73] Assignees: Aisin Aw Co., Ltd.; Toyota Jidosha Kabushiki Kaisha, Aichi, Japan

[21] Appl. No.: 313,233

[22] Filed: Feb. 21, 1989

[30] Foreign Application Priority Data

Feb. 20, 1988 [JP] Japan .................................. 63-37882

[51] Int. Cl.$^5$ ............................................. B60K 41/06
[52] U.S. Cl. ........................................ 74/868; 74/866
[58] Field of Search .................... 74/866, 867, 868, 869

[56] References Cited

U.S. PATENT DOCUMENTS

| | | | |
|---|---|---|---|
| 4,709,597 | 12/1987 | Yasue et al. | 74/868 |
| 4,722,250 | 2/1988 | Sumiya et al. | 74/868 X |
| 4,730,521 | 3/1988 | Hayasaki et al. | 74/867 |
| 4,843,917 | 7/1989 | Van Selous et al. | 74/868 |
| 4,850,251 | 7/1989 | Kuwayama et al. | 74/869 X |
| 4,854,195 | 8/1989 | Moroto et al. | 74/868 X |
| 4,889,016 | 12/1989 | Kuwayama et al. | 74/868 |

FOREIGN PATENT DOCUMENTS

61-130653 6/1986 Japan .

Primary Examiner—Allan D. Herrmann
Assistant Examiner—Benjamin Levi
Attorney, Agent, or Firm—Wenderoth, Lind & Ponack

[57] ABSTRACT

An accumulator back pressure control device for an automatic transmission regulates the accumulator back pressure when a shift valve is switched. For example, when up-shifting from first to second speed, when the second brake starts to engage by switching of a shift valve, the rotational speed of the input is varied to change the output torque of the transmission gear mechanism. By detecting the change in rotational speed with a sensor, a pressure control valve (linear solenoid) is controlled by signals from a control unit so that the control pressure is regulated at a desired time. Thus, for example, the change of hydraulic pressure at a control pressure port regulates the oil source pressure (line pressure) and applies such regulated pressure to the back pressure chamber of an accumulator to change the back pressure of the accumulator. When shifting from second to third speed, the back pressure of another accumulator is similarly controlled, and when shifting from third to fourth speed, the back pressure of still another accumulator is similarly controlled. When down-shifting, the operations are preformed in the same manner as described above.

11 Claims, 9 Drawing Sheets

| POSITION | | SOLENOID | | | CLUTCH | | | BRAKE | | | | ONE-WAY CLUTCH | | |
|---|---|---|---|---|---|---|---|---|---|---|---|---|---|---|
| | | S1 | S2 | S3 | C1 | C2 | C0 | B1 | B2 | B3 | B0 | F1 | F2 | F0 |
| P | | O(x) | X | X | X | X | O | X | X | X | X | X | X | X |
| R | | O(x) | O | X | X | O | O | X | X | O | X | X | X | O |
| R (v≧7) | | O(x) | X | X | X | O | O | X | X | O | X | X | X | O |
| N | | O(x) | X | X | X | X | O | X | X | X | X | X | X | X |
| D | 1ST | O | O | X | O | X | O | X | X | X | X | X | ⊗ | O |
| | 2ND | O | O | ⊚ | O | X | O | X | O | X | X | ⊗ | X | O |
| | 3RD | X | O | ⊚ | O | O | O | X | O | X | X | X | X | O |
| | 4TH | X | X | ⊚ | O | O | X | X | O | X | O | X | X | X |
| 2 | 1ST | O | O | X | O | X | O | X | X | X | X | X | ⊗ | O |
| | 2ND | O | O | ⊚ | O | X | O | X | O | X | X | ⊗ | X | O |
| | 3RD | X | X | X | O | O | O | O | X | X | X | O | X | O |
| | (3RD) | X | X | X | O | O | O | X | O | X | X | X | X | O |
| L | 1ST | O | O | X | O | X | O | X | X | X | X | X | X | O |
| | 2ND | O | O | X | O | X | O | O | O | X | X | O | X | O |
| | (1ST) | X | X | X | O | X | O | X | X | O | X | X | O | O |
| REMARKS | | ON | | | ENGAGE | | | ENGAGE | | | | LOCK | | |
| | | OFF | | | RELEASE | | | RELEASE | | | | FREE | | |
| | | ⊚ { ON·L·UP·ON ; OFF·L·UP·OFF } | | | — | | | — | | | | — | | |
| | | ⊗ | | | | | | | | | | | FREE AT COSTING | | |

HYDRAULIC CONTROL DEVICE FOR AN AUTOMATIC TRANSMISSION

BACKGROUND OF THE INVENTION

1. Field of the Invention

The present invention relates to a hydraulic control device for an automatic transmission which is particularly mounted on an automobile, and more particularly relates to a device to control accumulator back pressure.

2. Description of the Prior Art

Conventionally, a hydraulic device for an automatic transmission has a hydraulic servo for a brake and clutch operatively hydraulically connected with an accumulator so that engaging pressure and releasing pressure are determined by a characteristic of the accumulator to reduce a shift-shock.

Control pressure acts on a back pressure side of the accumulator so that the back pressure is lowered when a throttle opening ratio is small to further reduce shift-shock.

Furthermore, as disclosed in the Japanese Laid-Open patent No. Sho-61-130653, an accumulator control valve is controlled by a solenoid valve which is in turn controlled based on the degree of opening of a throttle valve to reduce shift-shock.

Figure 6A:
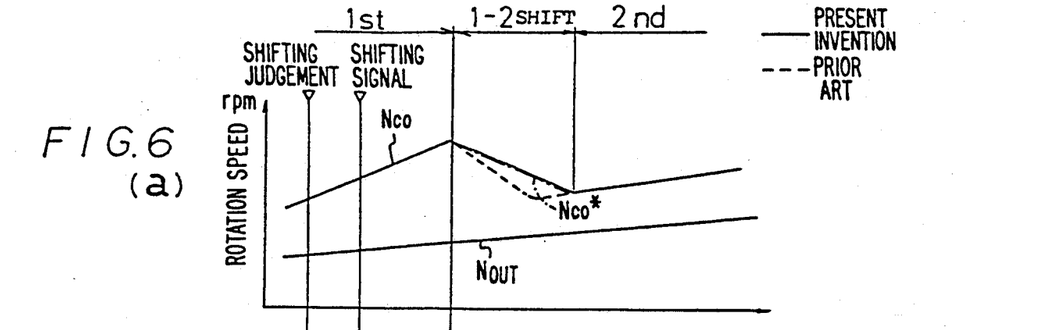
Figure 6B:
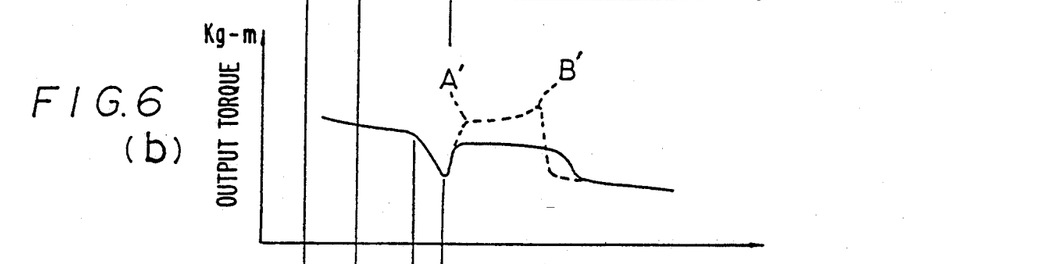
Figure 6C:
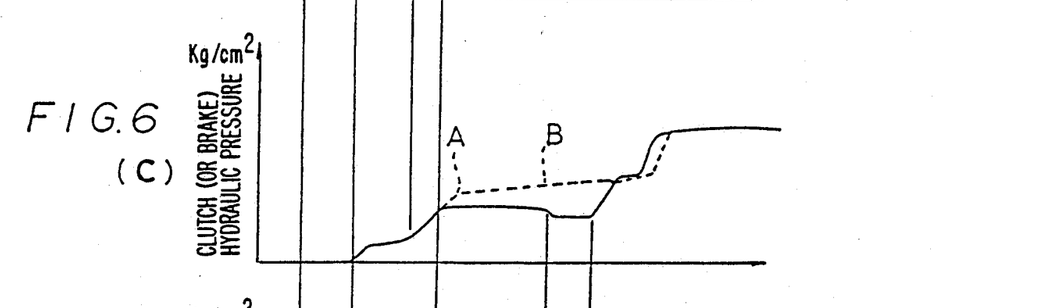
Figure 6D:
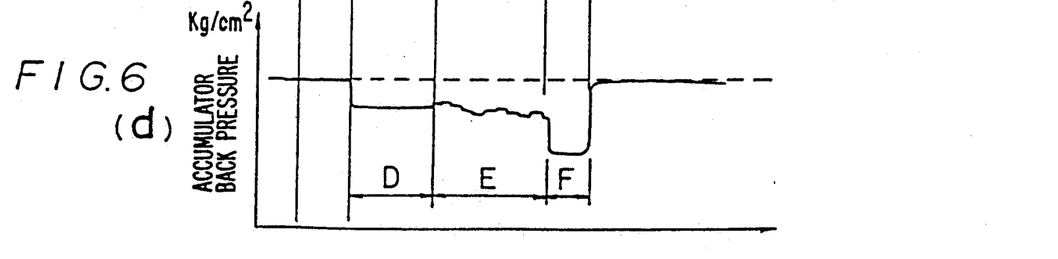
Figure 7A:
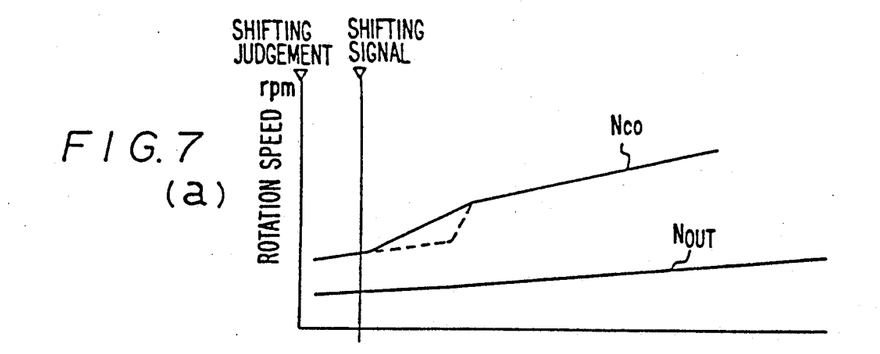
Figure 7B:
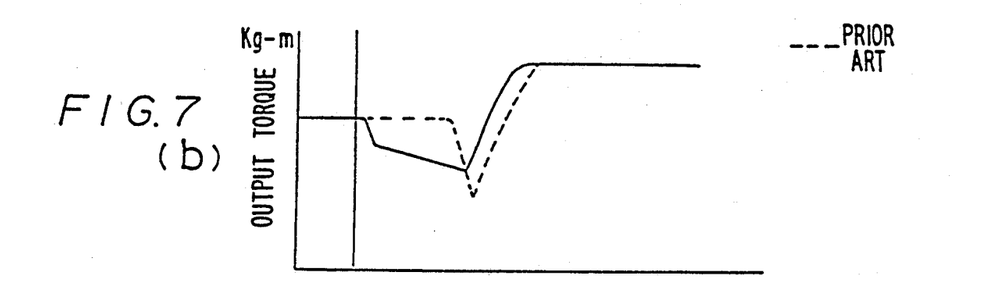
Figure 7C:
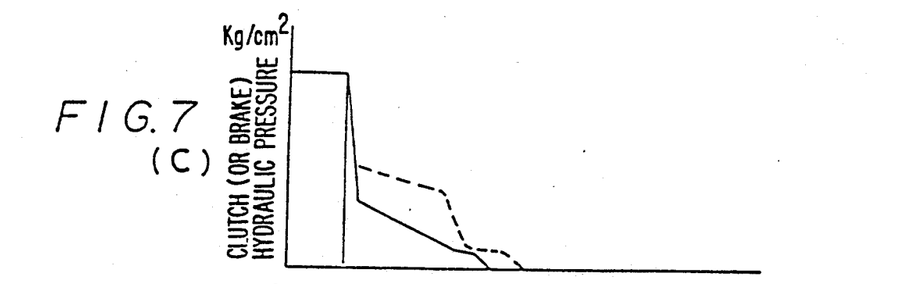
FIG. 7(c) a graphical representation of the down-shift time and the clutch (brake) hydraulic pressure.
Figure 7D:
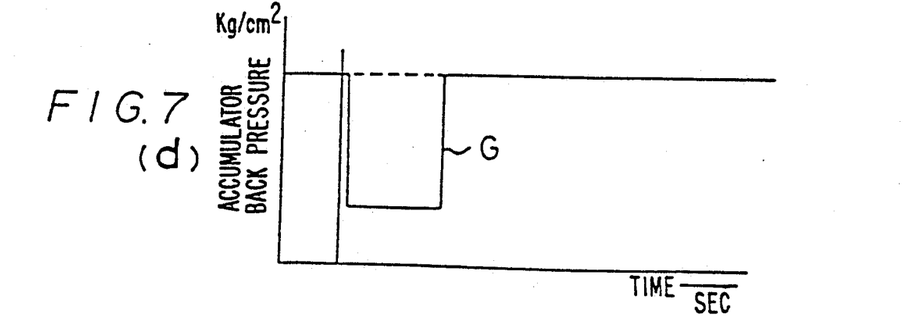
FIG. 7(d) is a graphical representation of the down-shift time and the accumulator back pressure.

The above-mentioned device having an accumulator control valve applies constant accumulator back pressure to the back pressure side of the accumulator during shifting as shown in FIG. 6(d) and FIG. 7(d) by the dotted lines.

Accordingly, hydraulic pressure applied to the clutch (or brake) rises, as shown beginning at a point A in FIG. 6(c) by the dotted lines, based on a starting resistance offered by an 0-ring. After that, the hydraulic pressure rises linearly at a ratio B until the clutch plates are completely engaged.

As a result, an output torque, as shown in FIG. 6(b) by the dotted lines, rises sharply to point A' corresponding to the point A, and further rises to a sharp peak B' caused by a change in the frictional force at the clutch plates.

Similar to the above, when the hydraulic pressure is released, as shown in FIG. 7(c) by the dotted lines, the clutch hydraulic pressure is lowered, so that the output torque rises sharply as shown in FIG. 7(b) by the dotted lines.

In the above hydraulic device, it is difficult to sufficiently reduce shift-shocks during up-shifting and down-shifting.

Furthermore, a hydraulic control device controlling an accumulator control valve by using a solenoid valve cannot control the back pressure of the accumulator adequately and precisely because the solenoid valve is controlled by the degree to which a throttle is open.

SUMMARY OF THE INVENTION

The present invention is aimed at controlling the back pressure of an accumulator so that an output torque has an adequate value, and so as to reduce a shift-shock.

Figure 1:
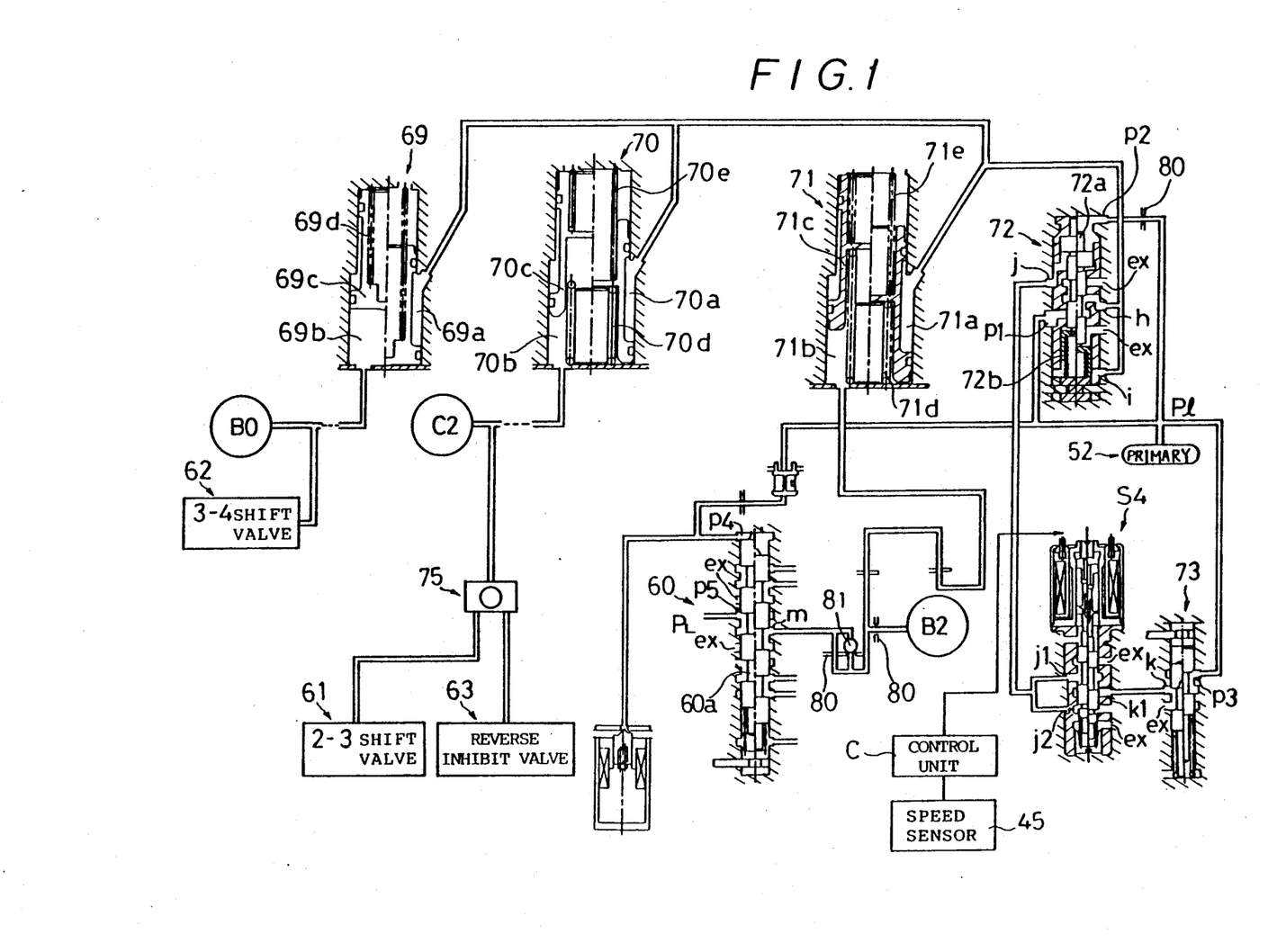
FIG. 1 is a schematic diagram, in section, of a main part of a hydraulic control device according to the present invention

The present invention, taking the above-mentioned situation into consideration, provides, for example, as shown in FIG. 1, a hydraulic control device for an automatic transmission, comprising: hydraulic servos (B2), (C2), (B0) to control frictional engaging elements (for example, a second brake B2, a direct clutch C2 and an over-drive brake B0) to engage or restrain certain gear elements (for example, a sun gear 30 of a main transmission unit 21) of a transmission gear mechanism; accumulators (71), (70), (69) situated in parallel with the hydraulic servos; and shift valves (60) (61), 62) to apply and drain hydraulic servos; and shift valves (60), (61), (62) to apply and drain hydraulic pressure to and from the hydraulic servos and the accumulators; and back pressure chambers (71a), (70a), (69a) defined to respective one sides of pistons of the accumulators (71), (70), (69). And hydraulic pressure regulated by a pressure control valve (for example, a linear solenoid valve S4) is applied to the chambers, and the pressure control valve (S4) is controlled by a sensor which detects a change in the rotational speed during the shifting of the shift valves (60), (61), (62). (The sensor, for example, may be a rotation speed detecting sensor 45 to detect a rotation of a member 42 which rotates with part of a frictional engaging element (C0), and has different rotating ratio of an output shaft at each shifting stage and stops at the highest shifting stage.)

As one example, hydraulic pressure from the pressure control valve (S4) is applied to a control port (j) of an accumulator control valve (72), so that the hydraulic pressure from a certain oil source (for example, line pressure) is regulated, and is applied to the accumulator back pressure chambers (71a), (70a), (69a) from a regulating port (h) of the valve (72).

Based on the above structure, when up-shifting from the first speed to the second speed, for example, the second brake (B2) starts to engage due to the switching of the shift valve (60), and the rotational speed of the input varies because the output torque of the shift gear mechanism varies. By detecting the change of rotational speed with the sensor (45), the pressure control valve (S4) is controlled by the signals from the sensor (C) at a required moment. Due to the above actions, the control valve (72) regulates the hydraulic pressure from the oil source (the line pressure at port pl) based on the hydraulic pressure applied to the port (j) of the control valve (72), and the regulated pressure is applied to the back pressure chamber (71a) of the accumulator (71) from the regulating port (h) of the control valve (72), so that the accumulator back pressure is varied as shown in FIG. 6(d) by the full lines. Then, the starting resistance offered by the 0-ring and the frictional force at the frictional engaging member are averaged, so that the brake hydraulic pressure varies as shown in FIG. 6(c) by the full lines, and the output torque varies smoothly as shown in FIG. 6(b) by the full lines.

Similar to the above, when down-shifting, by changing the accumulator back pressure based on the pressure control valve (S4), the clutch (or brake) hydraulic pressure and the output torque vary as shown in FIGS. 7(c), (d) by the full lines.

Incidentally, the reference numerals in the parentheses are used only for reference with the drawings and do not define the invention. The same number may be used differently in the following description than in the previous description in which broader concepts are adopted.

BRIEF DESCRIPTION OF THE DRAWINGS

In the drawings:

FIG. 6 a graphical representation showing the up-shift time vs. parameters, wherein FIG. 6 (a) is a representation of the up-shift time and rotating speeds of each element;

FIG. 6 (b) is a graphical representation of the up-shift time and the output torque;

FIG. 6 (c) is a graphical representation of the up-shift time and the clutch (brake) hydraulic pressure;

FIG. 6 (d) is a graphical representation of the up-shift time and the accumulator back pressure;

FIG. 7 is a graphical representation showing the down-shift time vs. respective parameters, wherein:

FIG. 7 (a) is a graphical representation of the down-shift time and rotating speed of each element;

FIG. 7 (b) is a graphical representation of the down-shift time and the output torque;

DETAILED DESCRIPTION OF THE PREFERRED EMBODIMENTS

The present invention will now be explained with reference to the drawings.

Figure 2:
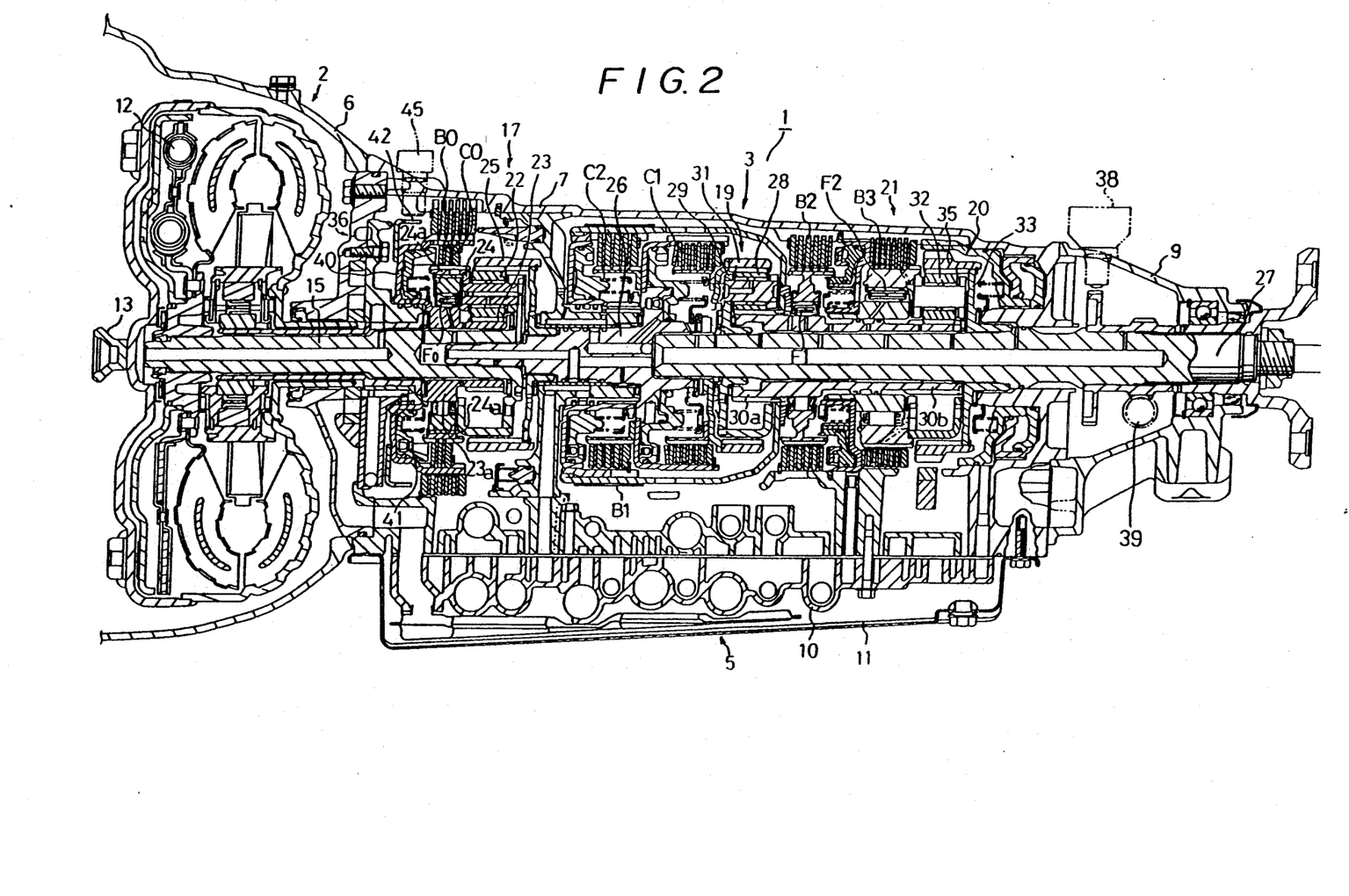
FIG. 2 is a cross-sectional view of an automatic transmission to which the present invention is applied.
Figure 3:
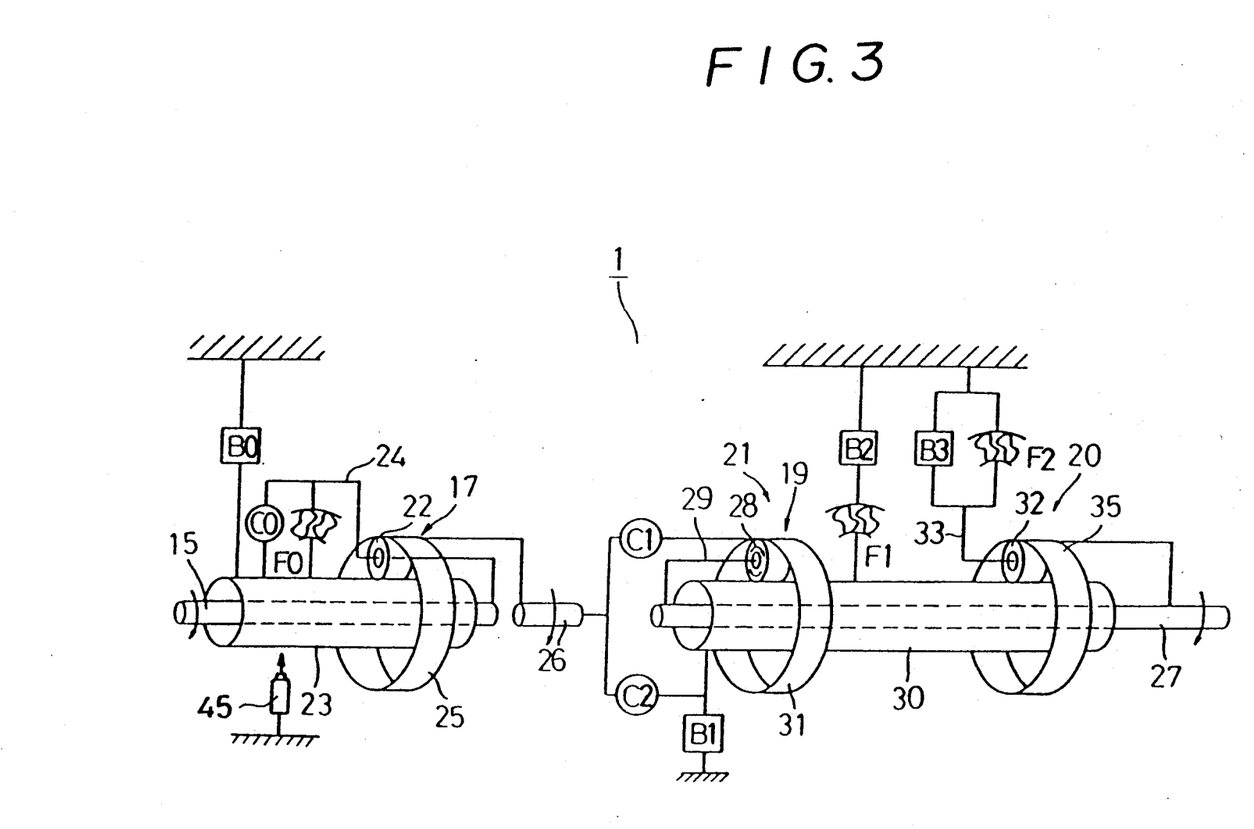
FIG. 3 is a schematic representation of the automatic transmission.

An automatic transmission 1, as shown in FIGS. 2 and 3, has a torque converter 2, a planetary transmission gear mechanism 3 and a hydraulic control device 5 which are housed in a converter housing 6, a transmission case 7, an extension housing 9, a valve body 10 and an oil pan 11. The torque converter 2 has a lock-up clutch 12, so that rotation of an input member 13 is transmitted to an input shaft 15 of the transmission gear mechanism 3 through hydraulic fluid of the torque converter 2 or the lock-up clutch 12. The gear mechanism 3 consist of an over-drive planetary gear unit 17 and a main transmission unit 21 including a front planetary gear unit 19 and a rear planetary gear unit 20. The over-drive planetary gear unit 17 comprises a planetary pinion 22, a carrier 24 which is directly connected to the input shaft 15 and supports the pinion 22, a sun gear 23 which enclosed the input shaft 15, and a ring gear 25 which is connected to an input shaft 26 of the main transmission mechanism 21. An over-drive direct clutch C0 and a one-way clutch F0 are situated between the carrier 24 and the sun gear 23, and an over-drive brake B0 is situated between the sun gear 23 and the case 7. The front planetary gear unit 19 comprises a planetary pinion 28, a carrier 29 which is directly connected to an output shaft 27 and supports the pinion 28, a sun gear 30a which encloses the output shaft 27 and is constituted integrally with a sun gear 30b of the rear planetary gear unit 20, and a ring gear 31 which is connected to the input shaft 26 through a forward clutch C1. A direct clutch C2 is situated between the input shaft 26 and the sun gear 30, a second-coast brake B1 in the form of a band brake is situated between the sun gear 30 and the case 7. The rear planetary gear unit 20 comprises a planetary pinion 32, a carrier 33 which supports the pinion 32, a sun gear 30b, and a ring gear 35 which is directly connected to the output shaft 27. A first and reverse brake B3 and a one-way clutch F2 are situated radially between the carrier 33 and the case 7. Incidentally, reference number 36 in FIG. 2 designates an oil pump, 38 an output shaft rotation sensor, and 39 a rotation output gear for the speedometer And, as shown in FIG. 2, with regard to the over-drive planetary gear unit 17, the one-way clutch F0 is situated between a boss 23a of the sun gear 23 and a sleeve 24a of the carrier 24. A flange member 40 which constitutes a cylinder extends from the boss 23a. The flange member 40 encloses a piston member 41 to form a hydraulic actuator of the clutch C0, the over-drive direct clutch C0 being situated between the sleeve 24a and an inner surface of the flange 40. The over-drive brake B0 is situated between an outer surface of the flange 40 and the case 7. Furthermore, a rim 42 is fixed on a peripheral part of the flange 40. A non-contacting type sensor 45 such as one employing light or magnetism or the like is situated on the case 7 so that the sensor 45 faces plural through holes or slits which are formed on the rim 42. The sensor 45 is situated to detect the rotational speed of the flange 40 fixed on the sun gear 23, in other words, to detect the rotational speed of the input shaft 15 which rotates together with the sun gear 23 when the clutch C0 directly connects the input shift 15 and sun gear 23 at the first, second and third speeds.

Next, a hydraulic control device 5 will be explained with reference to FIG. 4.

Reference characters C0, C1 and C2 designate hydraulic servos for each clutch, and B0, B1, B2 and B3 designate hydraulic servos for each brake. Reference numeral 2 designates the torque converter, 36 an oil pump, 45 the speed sensor, and 51 a manual valve where a line pressure port p is connected to ports a, b, c and d which correspond to ranges of R, P, N, D, S and L, as shown in the table in FIG. 4. Reference numeral 52 designates a primary regulator valve, 53 a throttle valve, 55 a secondary regulator valve, 56 a lock-up control valve, 57 a lock-up relay valve, 58 a solenoid relay valve, and 59 a cutback valve. Reference numeral 60 designates a 1-2 shift valve, 61 a 2-3 shift valve, 62 a 3-4 shift valve, 63 a reverse inhibit valve, 65 a low-coast modulator valve, 66 a second-coast modulator valve, 67 an accumulator for the clutch C0, 70 an accumulator for the clutch C2, and 71 an accumulator for the brake B2. Reference numeral 72 designates an accumulator control valve which regulates hydraulic pressure applied to back pressure chambers 69a, 70a and 71a of the accumulators 69, 70, and 71. Reference characters S1, S2 and S3 designate solenoid valves to control the shift valves 60, 61 and 62. Reference character S4 designates a linear solenoid valve which regulates hydraulic pressure from a solenoid regulator valve 73, and the regulated pressure is applied to the accumulator control valve 72.

Next, an accumulator control device which is a main part of the present invention will be explained along with FIG. 1.

The accumulator control valve 72 has a line pressure port p1, back-up port p2, a regulating port h connected to back pressure chambers 71, 70a, 69a of accumulators 71, 70, 69, a feedback port i, a control port j to which hydraulic pressure from the linear solenoid valve S4 is applied, a drain port ex and a spring 72b which presses one end of a spool 72a. The linear solenoid valve S4 is controlled by a control unit C based on an electric signal from the sensor 45 which detects the rotation of C0, or the rotational speed of the sun gear 23 of the over-drive planetary gear unit 17. The solenoid valve S4 has ports j1, j2 which are connected to the port j of the accumulator control valve 72, a port k1 which is connected to a regulator port k of the solenoid modulator valve 73, a port p3 to which the line pressure is applied from other than the regulator port k so that the line pressure is reduced as required to the port k1 of the solenoid valve S4. The $B_2$ accumulator 71 has an accumulator chamber 71b, a back pressure chamber 71a having a small volume, springs 71d, 71e having certain spring constants and respectively compressed at both ends of a piston 71c. The back pressure chamber 71a is hydraulically connected to the port h of the control valve 72, while the accumulator chamber 71b is hydraulically connected to the second brake hydraulic servo B2 through an orifice 80 and check ball-valve 81, and the chamber 71b is connected to a port m of the 1-2 shift valve 60. In the 1-2 shift valve 60, hydraulic pressure from the solenoid valve S2 works on a spool-top chamber p4 to switch a spool 60a. When the valve S2 is ON, the spool 60a is at the left-half position (the second, third and fourth speeds), then the line pressure port p5 and the port m are open to one another, while when the valve S2 is OFF, the spool 60a is at the right-half position (the first speed), the port p5 and the port m are disconnected, and the port m is connected to the drain port ex.

Similar to the above, an over-drive brake accumulator 69 has an accumulator chamber 69b, a back pressure chamber 69a, a piston 69c, and a spring 69d having a certain spring constant and compressed at the side of the piston 69c opposite the accumulator chamber 69b. And, the back pressure chamber 69a is hydraulically connected to the port h of the accumulator control valve 72, and the accumulator chamber 69b is hydraulically connected to the over-drive brake hydraulic servo B0 through an orifice and a check ball-valve, and to a certain port of the 3-4 shift valve 62 (the port n which the line pressure is applied at the left-half position of the valve 62 as shown in FIG. 4). The accumulator 70 for the direct clutch C2 has an accumulator chamber 70b, a back pressure chamber 70a having a small volume, and springs 70d, 70e having certain spring constants which are compressed at both ends of piston 70c, respectively. The back pressure chamber 70a is hydraulically connected to the port h, while the accumulator chamber 70b is hydraulically connected to the direct clutch hydraulic servo C2 through an orifice and a check ball-valve, and to a certain port of the 2-3 shift valve 61 (the port m to which the line pressure is applied at the left-half position of the valve 61 or port o (FIG. 4) of the reverse inhibit valve 63 through a mutual switching valve 75).

Incidentally, the accumulators 71, 69 and 70 for the second brake hydraulic servo B2, the over-drive brake hydraulic servo B0 and the direct clutch hydraulic servo C2 are controlled by one accumulator control valve 72 and the solenoid valve S4 through each back pressure chamber 71, 69a and 71; however, these servos are not put into operation at the same time because the brake B2, the clutch C2 and the brake B0 are sequentially engaged during up-shifting from second to fourth speeds.

The operation of the present invention will now be explained.

Figure 5:
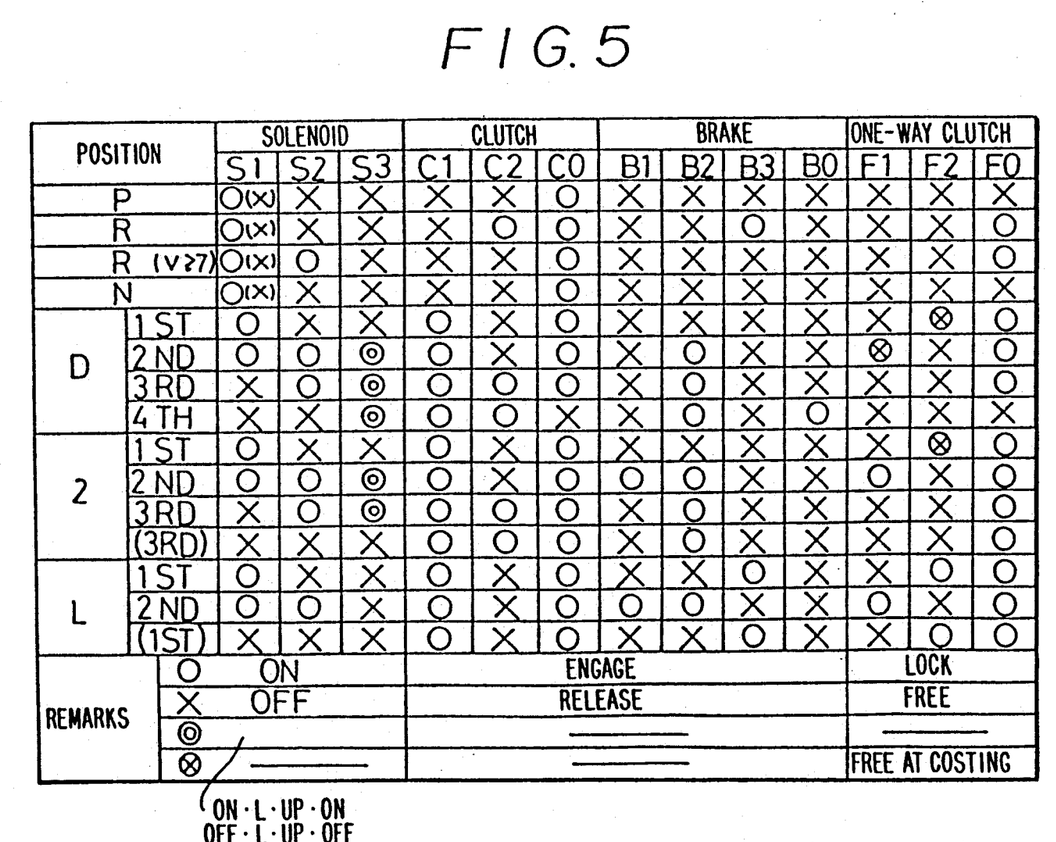
FIG. 5 is a table of operation of solenoid valves, clutches, brakes and one-way clutches at each shifting position.

The solenoid valves S1, S2 and S3, the clutches C0, C1 and C2, the brakes B0, B1, B2 and B3, and the one-way clutches F0, F1 and F2 are operated in the P, R, R (at a speed more than 7 km/h), N, D, 2 and L ranges, as shown in FIG. 5.

In other words, at the first speed of the D or 2 range, the solenoid valve S1 is ON, so that the over-drive direct clutch C0, the one-way clutches F0, F2 and the forward clutch C1 are engaged, and the other frictional engaging elements are all disengaged. Accordingly, all elements of the over-drive planetary gear unit 17 rotate together through the clutch C0 and the one-way clutch F0; thus, rotation of the input shaft 15 is transmitted the input shaft 26 of the main transmission unit 21 without a reduction in the speed of rotation. At the main transmission unit 21, rotation of the input shaft 26 is transmitted to the ring gear 31 of the front planetary gear unit 19, and is transmitted to the carrier 29 and the output shaft 27 which is integrally connected with the carrier 29. At the same time, the rotation is transmitted to the carrier 33 of the rear planetary gear unit 20, and the carrier 33 is provided with torque in the left rotational direction. However, the carrier 33 is restrained by the one-way clutch F2; thus the planetary pinion 32 rotates, and this rotation is transmitted to the ring gear 35 which is integrally connected with the output shaft 27.

At the second speed of the D range, the solenoid valve S2 is ON in addition to the solenoid valve S1. The over-drive direct clutch C0, the one-way clutch F0, the forward clutch C1, the one-way clutch F1 and the second brake B2 are engaged, and the other frictional engaging elements are all disengaged. Accordingly, the over-drive planetary gear 17 is still kept under the direct operating condition, and the rotation of the input shaft 15 is transmitted to the input shaft 26 without a reduction in the speed of rotation. At the main transmission unit 21, rotation of the input shaft 26 is transmitted to the ring gear 31 through the forward clutch C1, and the sun gear 30 is provided with torque in the left rotational direction through the pinion 28. However, the sun gear 30 is restrained from rotating in the left rotational direction by the operation of the one-way clutch F1 because of the engagement of the brake B2. Consequently, the planetary pinion 28 rotates and the carrier 29 rotates. Then the rotation of the carrier 29 is directly transmitted to the output shaft 27, namely the rotation is transmitted only through the front gear unit 19 to the output shaft 27.

At this moment, as shown in FIG. 6, a shifting signal is issued when a predetermined time has lapsed after a shifting judgement is made. As friction plates of the second brake B2 are moved into contact due to an application of hydraulic pressure to the B2 hydraulic servo, the output torque varies and, as a result, the rotational speed of the flange 40 which rotates together with the input shaft 15 also varies. The varied rotation is detected by the sensor 45 so that an actual rotation Nco can be made nearly equal to a target rotation Nco*. In other words, the solenoid valve S4 is controlled by the electric signals of the control unit C based on the signals of the sensor 45. Consequently, hydraulic pressure applied from the solenoid modulator valve 73 is regulated in the solenoid valve S4 and such regulated pressure issues from the ports j1, j2 as a predetermined control hydraulic pressure. The predetermined control pressure is applied to the port j of the accumulator control valve 72. The control valve 72 is disposed at the right-half position (FIG. 1) by hydraulic pressure being applied to the back-up port p2 through an orifice 80, and the line pressure applied through the port p1 issues from the port h to the back pressure chamber 71a of the accumulator 71. In the above state of the control valve 72, the control pressure from the port h acts on a bulged section of the spool, and the pressure, with the pressing force of the spring 72b, moves the spool against the line pressure at the back-up port p2. Consequently, the line pressure at the port p1 is reduced in accordance with the control pressure and issues from the port h. The reduced pressure issues through the feedback port i to act on a lower part of the spool 72a. At the same time, the reduced pressure is applied to the back pressure chamber 71b of the accumulator 71. Because of these actions, the accumulator back pressure D as shown in FIG. 6(d) is reduced by certain amount so that an excessive rise of the output torque A' as shown in FIG. 6 (b) does not occur. When a shifting operation begins, the accumulator back pressure, as shown in E of FIG. 6(d), is feedback controlled so that the rotation Nco of the flange 40 (hereinafter called C0 rotation) is in turn controlled to the target rotation Nco*. Furthermore, just before the engagement of the friction plates, the accumulator back pressure F, as shown in FIG. 6(d), is reduced by a certain amount per time so that a sharp rise of torque B' as shown in FIG. 6(b) caused by a change in the frictional force between the friction plates does not occur. Due to the above, when up-shifting from first to second speed, a shift shock caused by the engagement of the second brake B2 is reduced. Incidentally, Nout shown in FIG. 6(a) is the rotation of the output shaft detected by the output shaft rotation sensor 38.

Figure 4:
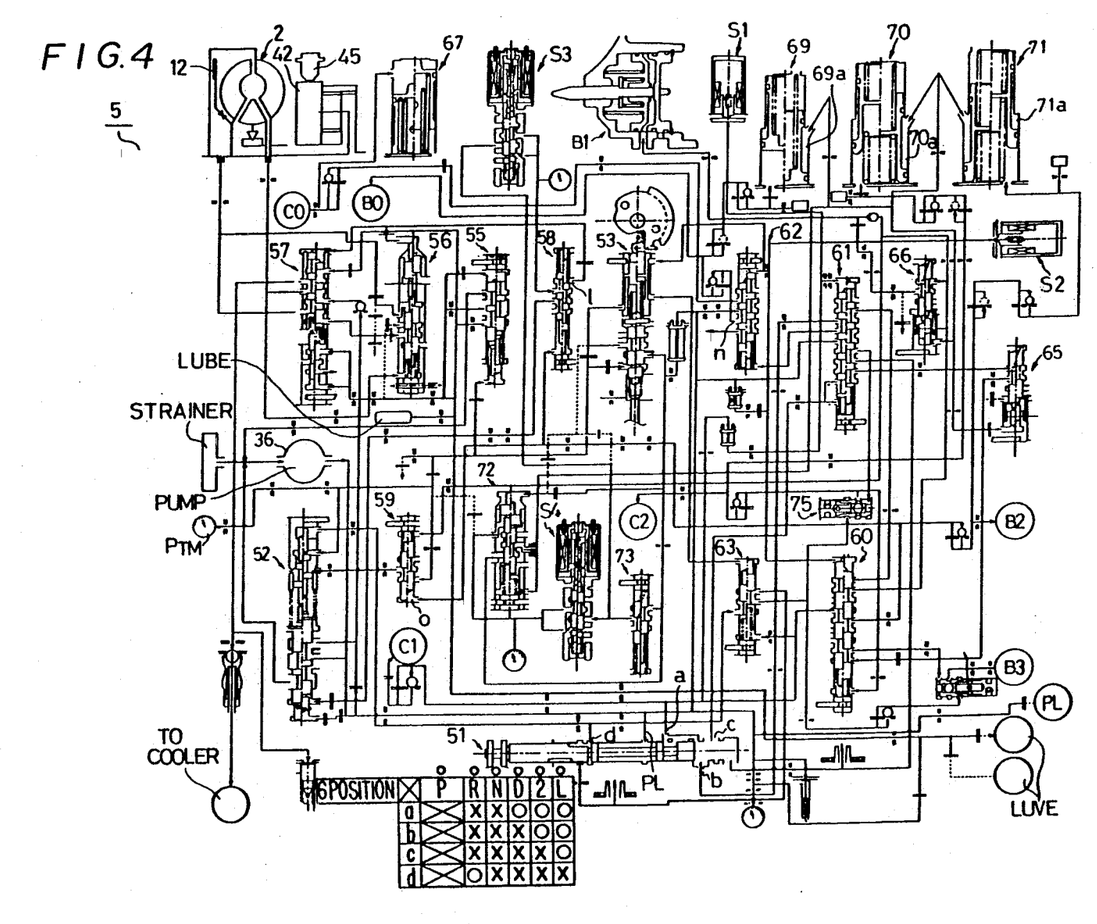
FIG. 4 is a hydraulic circuit diagram of the automatic transmission.

At the third speed of the D or second range, the solenoid valve S1 is OFF, and the 2-3 shift valve 61 is switched to the left-half position (FIG. 4). The overdrive direct clutch C0, the one-way clutch F0, the forward clutch C1, the direct clutch C2 and the second brake B2 are engaged, and the other frictional engaging elements are all disengaged. As a result, the over-drive planetary gear unit 17 is under the direct operating condition, and in the main transmission mechanism 21, the elements of the front planetary gear unit 19 rotate together because the clutches C1 and C2 are engaged. Thus, rotation of the input shaft 26 is transmitted to the output shaft 27 without a reduction in the speed of rotation.

The 2-3 shift valve 61 is switched due to the solenoid valve S1 being OFF, and the line pressure from the port m' is applied to the direct clutch hydraulic servo C2. At this moment, the line pressure is also applied to the accumulator chamber 70b of the C2 accumulator 70. As in the B2 accumulator 71, certain hydraulic pressure is applied to the back pressure chamber 70a of the C2 accumulator 70, and the linear solenoid valve S4 is controlled based on the signals from the speed sensor 45 so that the accumulator back pressure is controlled as shown in FIG. 6(d). Thus, the hydraulic pressure of the C2 hydraulic servo rises as shown in FIG. 6(c). Shift shock is reduced when shifting from the second to the third speed as when shifting from the first to the second speed.

At the fourth speed of the D range, or the highest shift stage, the solenoid valve S2 is also OFF, and the 3-4 shift valve 62 is switched to the left-half position.

The forward clutch C1, the direct clutch C2, and the second brake B2 are engaged. The main transmission mechanism 21, as in the third speed, is under the direct operating condition, while at the over-drive planetary gear unit 17, the direct clutch C0 is disengaged and the over-drive brake B0 is engaged. Accordingly, the sun gear 23 is locked by the brake B0, the planetary pinion 22 rotates with the carrier 24 which also rotates. This rotation is transmitted to the ring gear 25 as an over-drive rotation, and the over-drive rotation is transmitted to the input shaft 26 of the main transmission mechanism 21 which is under the direct operating condition.

At this time, the line pressure from the port n of the 3-4 shift valve 62 is applied to the over-drive brake hydraulic servo B0 and the accumulator chamber 69b of the accumulator 69; however, because of the disengagement of the direct clutch C0 and the engagement of the brake B0, rotation of the rim 42 which is integrally connected to the flange 40 connected to the sun gear 23 is restrained, and this state is detected by the sensor 45. Certain hydraulic pressure is applied to the back pressure chamber 69a of the B0 accumulator 69, and the linear solenoid valve S4 is controlled based on the signals of the speed sensor 45. As shown in FIG. 6, the hydraulic pressure for the brake B0 is controlled. On the other hand, in the direct clutch hydraulic servo C0, pressure rises comparatively quickly because the accumulator 67 is not subject to back pressure control, so that the clutch C0 is disengaged earlier than the brake B0. However, the carrier 24 is still under the control of the one-way clutch F0 regardless of the state of the clutch C0. As a result, shifting from the third speed to the fourth speed is effected by the engagement of the brake B0 and the disengagement of the clutch C0, and shift shock is reduced by the control of the B0 accumulator 69.

When down-shifting from the fourth to the third speed, the over-drive direct clutch C0 is engaged and the over-drive brake B0 is disengaged. When down-shifting from the third to the second speed, the direct clutch C2 is disengaged. Furthermore, when down-shifting from the second to the first speed, the second brake B2 is disengaged.

Under the above situation, the linear solenoid valve S4 is controlled by the electric signals from the control unit C based on the speed sensor 45. Thus, the accumulator back pressure generated in the back pressure chambers 69a of the B0 accumulator 69, 70a of the C2 accumulator and 71a of the B2 accumulator 71 are reduced with certain timing. Due to these actions, shift shock is reduced when down-shifting as when up-shifting, so that all shifting operations are performed smoothly. As shown in FIG. 7(c), conventionally, hydraulic pressure reduction shown by the dotted lines is not sufficient because back pressure is set based on an up-shifting, while in the present invention, the pressure reduction is performed as represented by the full lines, so that as shown in FIG. 7(b), the sharp change of output torque represented by the dotted lines is improved to that represented by the full lines. Due to this smooth output torque, shift shock when down-shifting is reduced as well as when up-shifting. As a result, the shifting operations are performed smoothly.

At the second speed of the second and L ranges, the second coast brake B1 is engaged and the sun gear 30 of the main transmission mechanism 21 is restrained, so that an engine-brake is effected.

At the first speed of the L range, the first and reverse brake B3 is engaged and the carrier 33 of the rear planetary gear unit 20 is restrained, so that the engine-brake is effected.

At the reverse range, the over-drive clutch C0, the one-way clutch F0, the direct clutch C2 and the first and reverse brake B3 are engaged, and the other frictional engaging elements are all disengaged. Accordingly, the over-drive planetary gear unit 17 is under the direct operating condition, and in the main transmission mechanism 21, rotation of the input shaft 26 is directly transmitted to the sun gear 30 through the clutch C2. And, because the carrier 33 is restrained by the brake B3, the rotation of the sun gear 30 is transmitted to the ring gear 35 as reverse rotation through the pinion 32 which rotates; thus, the output shaft 27 rotates reversely.

When the manual valve 51 is shifted to the R range, if the vehicle speed is greater than a certain speed (for example, 7 km/h) the solenoid valve S2 is switched ON so the direct clutch C2 is disengaged. As a result, no reverse running condition occurs.

Next, an embodiment which is a partially modified form of the above-described embodiment will be described with reference to FIGS. 8 and 9.

Figure 8:
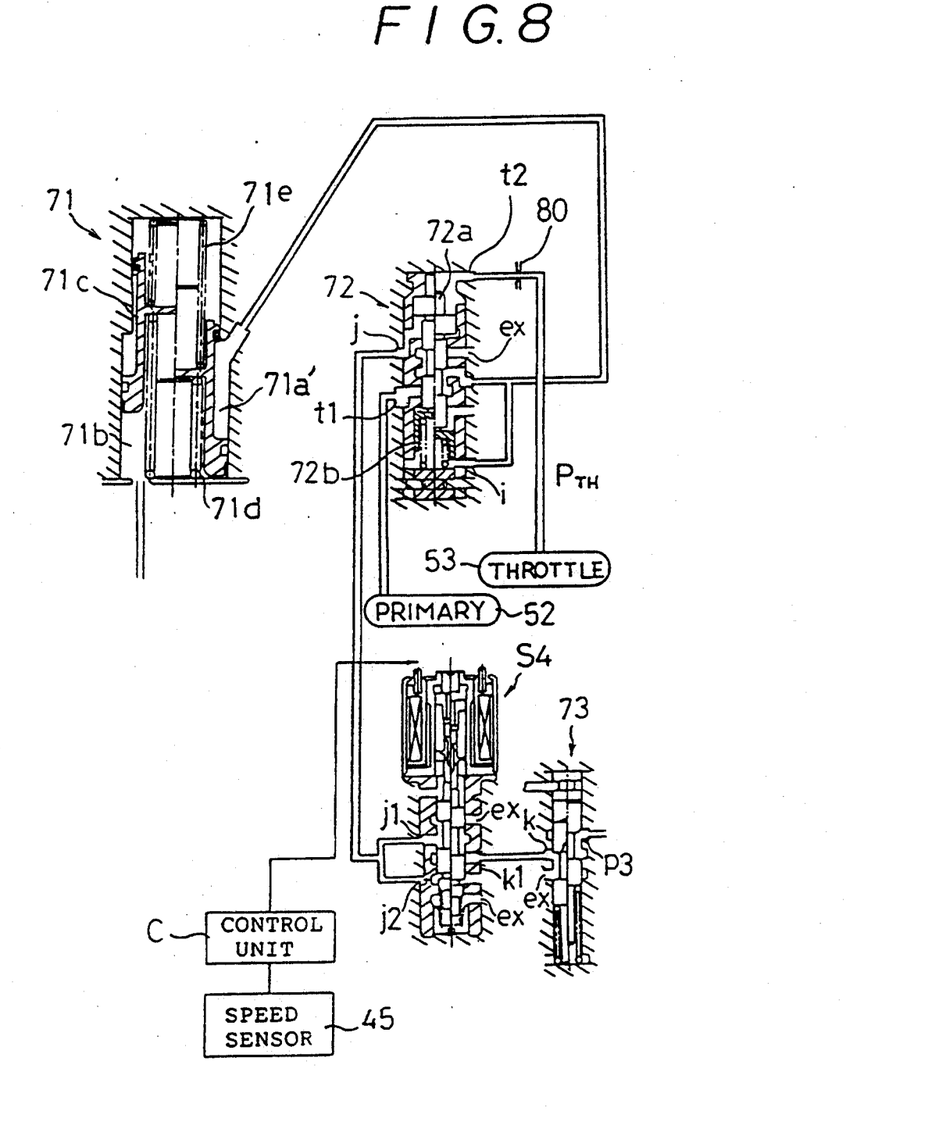
FIG. 8 is a schematic diagram, in section, of another embodiment according to the present invention.

In the embodiment shown in FIG. 8, throttle pressure $P_{th}$ of a throttle valve 53 is applied to the accumulator control valve 72. As in the previous embodiment, when regulated pressure from the linear solenoid valve S4 acts on the control port jo of the control valve 72, the throttle pressure at the throttle application port t1 is reduced by a certain amount. Then, the reduced pressure is applied to the back pressure chamber of the accumulator. Incidentally, as in the previous embodiment, the B0 accumulator 69 and the C2 accumulator 70 are controlled in the same manner as the B2 accumulator 71.

Figure 9:
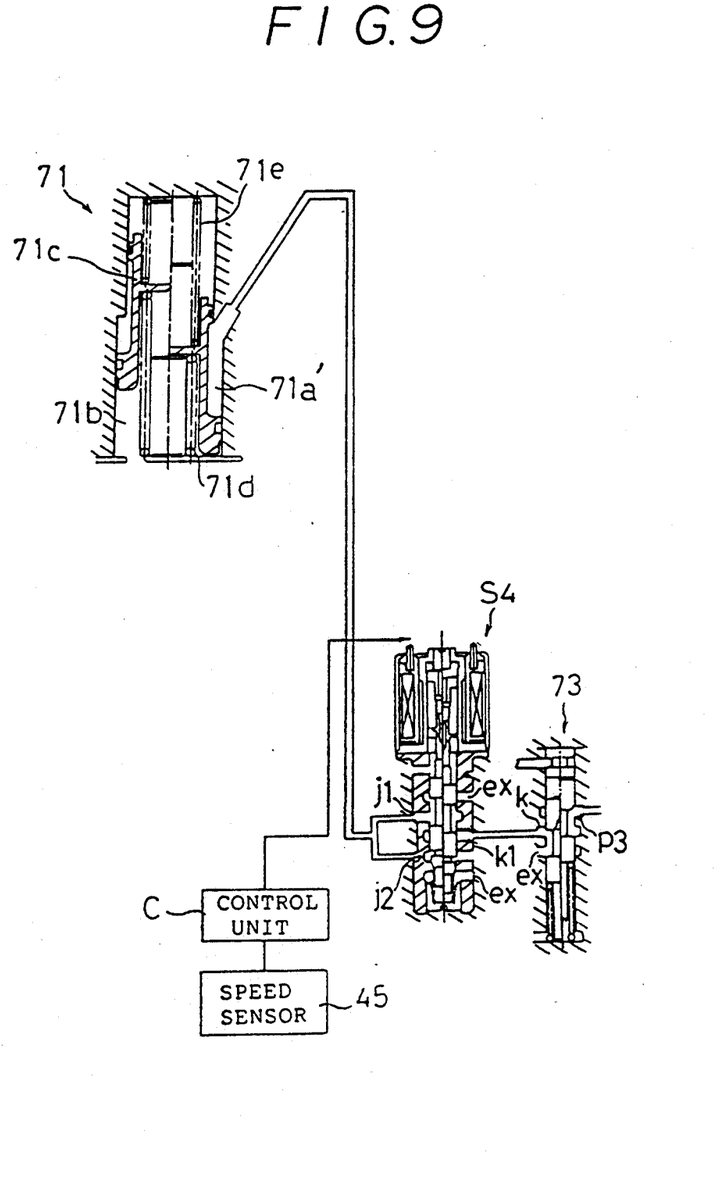
FIG. 9 is a schematic diagram, in section, of still another embodiment according to the present invention.

In the embodiment shown in FIG. 9, the regulated hydraulic pressure from the linear solenoid valve S4 is directly applied to a back pressure chamber 71a'. Normally, the control pressure ports j1, j2 apply certain hydraulic pressure to the accumulator back pressure chamber 71a', and when the speed sensor 45 detects a speed change, the linear solenoid valve S4 is controlled to reduce the amount of hydraulic pressure with certain timing.

The above embodiments have been described with respect to an automatic transmission having an over-drive planetary gear unit 17, and a sub-transmission unit. In addition to this arrangement, the engine-brake control device is also applicable to an automatic transmission without the above sub-transmission unit.

The above embodiment has also been described with respect to a Simpson type transmission unit, but the invention is not limited in application to this type of unit. Rather, the engine-brake control device is also applicable to a Ravigneaux type transmission unit.

TECHNICAL ADVANTAGES OF THE INVENTION

As explained, the hydraulic pressure of the accumulator back pressure chambers (71a), (70a), (69a) are controlled by the sensor (45) which detects the rotational speed which varies at the time of the shifting of the shift valve, so that engaging and disengaging of the frictional engaging elements (B2), (C2), (B0) are adequately controlled to make the change of output torque smooth, and to reduce the shift shocks at the time of shifting.

Furthermore, it is possible for the pressure in the accumulator back pressure chamber to control the hydraulic pressure in a respective servo in a different manner than that described above for up-shifting and down-shifting, so that the shift shock during down-shifting and up-shifting are reduced.

If the member whose rotational speed is detected by the sensor (45) is the flange/rim (40, 42) which rotates during the engagement of the frictional engaging element (C0) at a speed which varies during each stage of shifting and stops at the highest shifting stage, because such a flange/rim (40, 42) is located at the input side near the casing, its rotational speed can be easily and precisely detected. Furthermore, as shifting is carried out to the higher stage, and the change in rotational speed becomes small, it is normally difficult to detect such a change at the highest shifting stage. However, because the flange (40) stops rotating at the highest shifting stage based on the release of the frictional engaging element (C0), the change in rotational speed at the highest shifting stage (4th speed) is precisely and correctly detected due to such a change (stopping) being relative large.

Further a plurality of accumulators (71), (70), (69) which are not put into action at the same time can be simply controlled by one regulating valve (S4) through plural shifting stages. In particular, if the accumulators are a second brake accumulator (71), a direct clutch accumulator (70) and an over-drive accumulator (69), over all of the shifting stages, or between the first and second speeds, the second and the third speeds, and the third and fourth speeds, accumulator control can be performed.

When one frictional engaging element (B0) is engaged, another frictional engaging element (C0) is concurrently disengaged, as allowed by the use of the one-way clutch (F0). In such cases, for example, although there are two frictional engaging elements which are actuated to effect gear changes, it is sufficient to control the back pressure of the accumulator of only one frictional engaging element, whereby according to the present invention a back pressure control of all accumulators can be simply carried out.

We claim:

1. In an automatic transmission having a transmission gear mechanism including rotational elements driven at various respective rotational speeds in different speed stage of the transmission, and at least one frictional engaging element operatively connected to one of the rotational elements and engageable for restraining the rotation of said one of the rotational elements, a hydraulic control device comprising:

a source of hydraulic fluid pressure;

a hydraulic servo operatively connected to said at least one frictional engaging element for selectively engaging and disengaging said at least one frictional engaging element;

a shift valve operatively hydraulically connected in the control device between said source of hydraulic fluid pressure and said hydraulic servo for selectively supplying hydraulic fluid from said source to said servo and draining hydraulic fluid from said servo during respective shifting operations in which said at least one frictional engaging element is being put into engagement or is being disengaged; and shift-shock inhibiting means for inhibiting shock crated at said at least one frictional engaging element during one of said respective shifting operations said shift-shock inhibiting means including
an accumulator having a back pressure chamber in operative hydraulic communication with said hydraulic servo for regulating the pressure of hydraulic fluid issuing to said hydraulic servo,
accumulator control means operatively hydraulically connected in the control device between said source of hydraulic pressure and the back pressure chamber of said accumulator for regulation the pressure of hydraulic fluid generated in said back pressure chamber during said one of said respective shifting operations,
sensor means for detecting the rotational speed of said one of the rotational elements and for issuing signals indicative of the rotational speed, and
an electronic control unit operatively connected to said sensor means and to said accumulator control means for receiving the signals issued by said sensor, and for controlling said accumulator control means based on said signals to regulate the pressure of hydraulic fluid generated in said back pressure chamber during said one of said respective shifting operations to a pressure which causes said at least one fictional engaging element to restrain the rotation of said one of the rotational elements in a manner in which the rotational speed of said one of the rotational elements during said one of said respective shifting operations corresponds to a predetermined rotational speed.

2. A hydraulic control device in an automatic transmission as claimed in claim 1 and in which transmission the transmission gear mechanism includes an input shaft,
wherein said one of the rotational elements is connected to the input shaft of the transmission gear mechanism.

3. A hydraulic control device in an automatic transmission as claimed in claim 1 and in which transmission the transmission gear mechanism includes an input shaft, a main transmission unit, and an over-drive planetary gear unit, the over-drive planetary gear unit disposed between the input shaft of the transmission gear mechanism and the main transmission unit and including a carrier connected to the input shaft, a sun gear and a clutch disposed between the sun gear and the carrier,
wherein said one of the rotational elements if the sun gear.

4. A hydraulic control device in an automatic transmission as claimed in claim 1 and in which transmission a plurality of frictional engaging elements are provided for restraining the rotation of respective ones of the rotational elements of the transmission gear mechanism,
wherein a plurality of hydraulic servos are operatively connected to the frictional engaging elements, respectively, for selectively engaging and disengaging the frictional engaging elements, and
said shift-shock inhibiting means includes a plurality of accumulators having back pressure chambers in operative hydraulic communication with said hydraulic servos, respectively, for regulating the pressure of hydraulic fluid issuing to said hydraulic servos,
said accumulator control means being operatively hydraulically connected in the control device between said source of hydraulic pressure and the back pressure chamber of each of said accumulators.

5. A hydraulic control device in an automatic transmission as claimed in claim 1,
wherein said accumulator control means comprises a linear solenoid valve.

6. A hydraulic control device in an automatic transmission as claimed in claim 3,
wherein said accumulator control means comprises a linear solenoid valve.

7. A hydraulic control device in an automatic transmission as claimed in claim 4,
wherein said accumulator control means comprises a linear solenoid valve.

8. A hydraulic control device in an automatic transmission as claimed in claim 1,
wherein said accumulator control means comprises an accumulator control valve and a linear solenoid valve, said accumulator control valve in operative hydraulic communication with the back pressure chamber of said accumulator, and said linear solenoid valve controlling the position of said accumulator control valve responsive to said electronic control unit.

9. A hydraulic control device in an automatic transmission as claimed in claim 8,
wherein said accumulator control means further includes a throttle valve operatively hydraulically connected to said accumulator control valve for causing said accumulator control valve to regulate the pressure of hydraulic fluid generated in the back pressure chamber of said accumulator in response to throttle pressure generated by said throttle valve.

10. A hydraulic control device in an automatic transmission as claimed in claim 3,
wherein said accumulator control means comprises an accumulator control valve and a linear solenoid valve, said accumulator control valve in operative hydraulic communication with the back pressure chamber of said accumulator, and said linear solenoid valve controlling the position of said accumulator control valve responsive to said electronic control unit.

11. A hydraulic control device in an automatic transmission as claimed in claim 4,
wherein said accumulator control means comprises an accumulator control valve and a linear solenoid valve, said accumulator control valve in operative hydraulic communication with the back pressure chamber of each of said accumulators, and said linear solenoid valve controlling the position of said accumulator control valve responsive to said electronic control unit.

* * * * *